United States Patent [19]

Hwang

[11] Patent Number: 5,435,173

[45] Date of Patent: Jul. 25, 1995

[54] TIRE PRESSURE GAUGE

[76] Inventor: Raymond Hwang, No. 35, Sec. 4, Ting Tsao Rd., Lu Kang, Chang Huah, Taiwan

[21] Appl. No.: 213,509

[22] Filed: Mar. 16, 1994

[51] Int. Cl.$^6$ ............................................. B60C 23/02
[52] U.S. Cl. .................................... 73/146.8; 73/744
[58] Field of Search ................... 73/146, 146.2, 146.3, 73/146.4, 146.8, 744; 116/34 R; 340/442, 445, 448

[56] References Cited

U.S. PATENT DOCUMENTS

| | | | |
|---|---|---|---|
| 3,889,530 | 6/1975 | Bluem | 73/146.8 |
| 4,779,457 | 10/1988 | Hwang | 73/146.8 |
| 5,025,244 | 6/1991 | Hwang | 73/146.8 |
| 5,168,751 | 12/1992 | Hwang | 73/146.8 |
| 5,233,864 | 8/1993 | Hwang | 73/146.8 |
| 5,365,967 | 11/1994 | Moore | 73/146.8 |

*Primary Examiner*—Richard E. Chilcot, Jr.
*Assistant Examiner*—Elizabeth L. Dougherty
*Attorney, Agent, or Firm*—Browdy and Neimark

[57] ABSTRACT

A tire pressure gauge comprises an outer housing seat provided with a semicircular slot having one open end provided with a ring-shaped edge and having another open end provided with a semicircular arresting edge. A first outer housing cover is used to fix a guide tube. The outer housing seat is provided with a battery compartment and a lamp socket extending from the periphery of the battery compartment toward the outer edge of the outer housing seat. A second outer housing cover is used to fix the batteries and the lighting fixture. The guide tube is provided at the front end thereof with a partition having a protruded column extending outwards from the center thereof. The protruded column is provided in one side thereof with an air hole. Disposed sequentially behind the partition in the guide tube are a piston, a pressure scale, a spring and a plug having a through hole dimensioned to permit the pressure scale to extend therethrough.

8 Claims, 2 Drawing Sheets

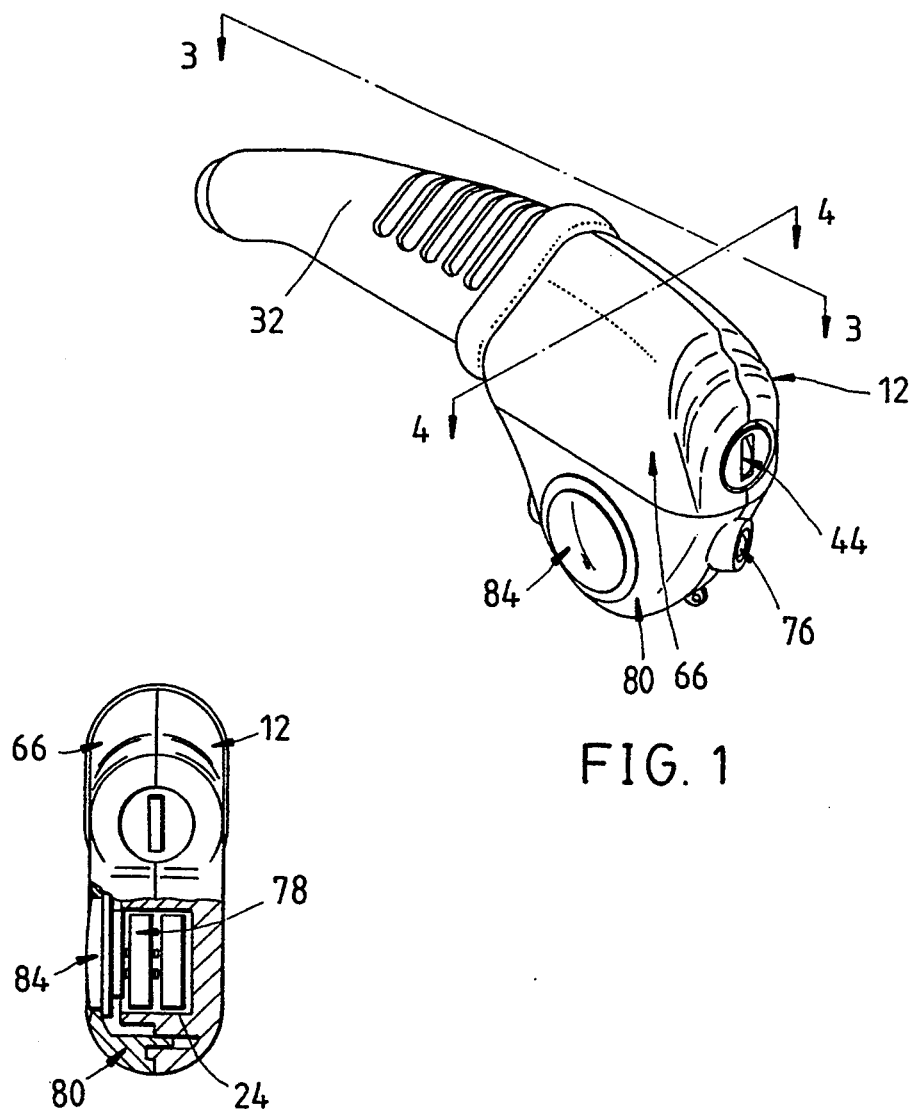
FIG. 1
FIG. 4
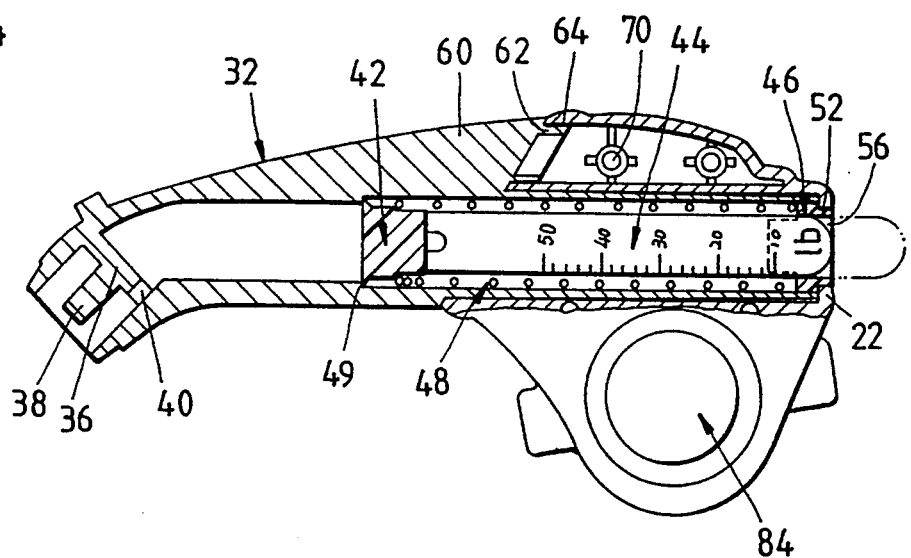
FIG. 3

TIRE PRESSURE GAUGE

FIELD OF THE INVENTION

The present invention relates generally to a tire pressure gauge, and more particularly to a refined tire pressure gauge, which can be assembled and disassembled easily and has a lighting fixture.

BACKGROUND OF THE INVENTION

The prior art tire pressure gauge is generally composed of a pressure measuring head and a guide tube. The pressure measuring head is provided with a protruded rod and an air hole. The guide tube is connected with the pressure measuring head and used to house therein a piston, a pressure-bearing spring, a scale, and a plug. Such a conventional tire pressure gauge as described above is defective in design in that the pressure measuring head and the guide tube can not be connected intimately after having been assembled and disassembled several times, thereby resulting in a leak in the seam between the pressure measuring head and the guide tube. In addition, it is inconvenient to use the prior art tire pressure gauge at night in a poorly lighted place because the prior art tire pressure gauge is not provided with a lighting fixture.

SUMMARY OF THE INVENTION

It is therefore the primary objective of the present invention to provide an improved tire pressure gauge which can be assembled and disassembled easily without causing a leak in the gauge.

It is another objective of the present invention to provide an improved tire pressure gauge with a lighting means to facilitate the use of the gauge in a poorly lit place.

The foregoing objectives of the present invention are accomplished by the improved tire pressure gauge which comprises an outer housing seat provided with a semicircular slot having one open end provided with a ring-shaped edge and having another open end provided with a semicircular arresting edge. A first outer housing cover is used to fix a guide tube. The outer housing seat is provided with a battery compartment and a lamp socket extending from the periphery of the battery compartment toward the outer edge of the outer housing seat. A second outer housing cover is used to fix the batteries and the lighting fixture. The guide tube is provided at the front end thereof with a partition having a protruded column extending outwards from the center thereof. The protruded column is provided in one side thereof with an air hole. Disposed sequentially behind the partition in the guide tube are a piston, a scale, a pressure-bearing spring and a plug having a through hole dimensioned to permit the scale to extend therethrough.

BRIEF DESCRIPTION OF THE DRAWINGS

FIG. 1 shows a perspective view of a preferred embodiment of the present invention.

FIG. 3 shows a sectional view of a portion taken along the line 3—3 as shown in FIG. 1.

FIG. 4 shows a sectional view of a portion taken along the line 4—4 as shown in FIG. 1.

DETAILED DESCRIPTION OF THE INVENTION

Figure 2:
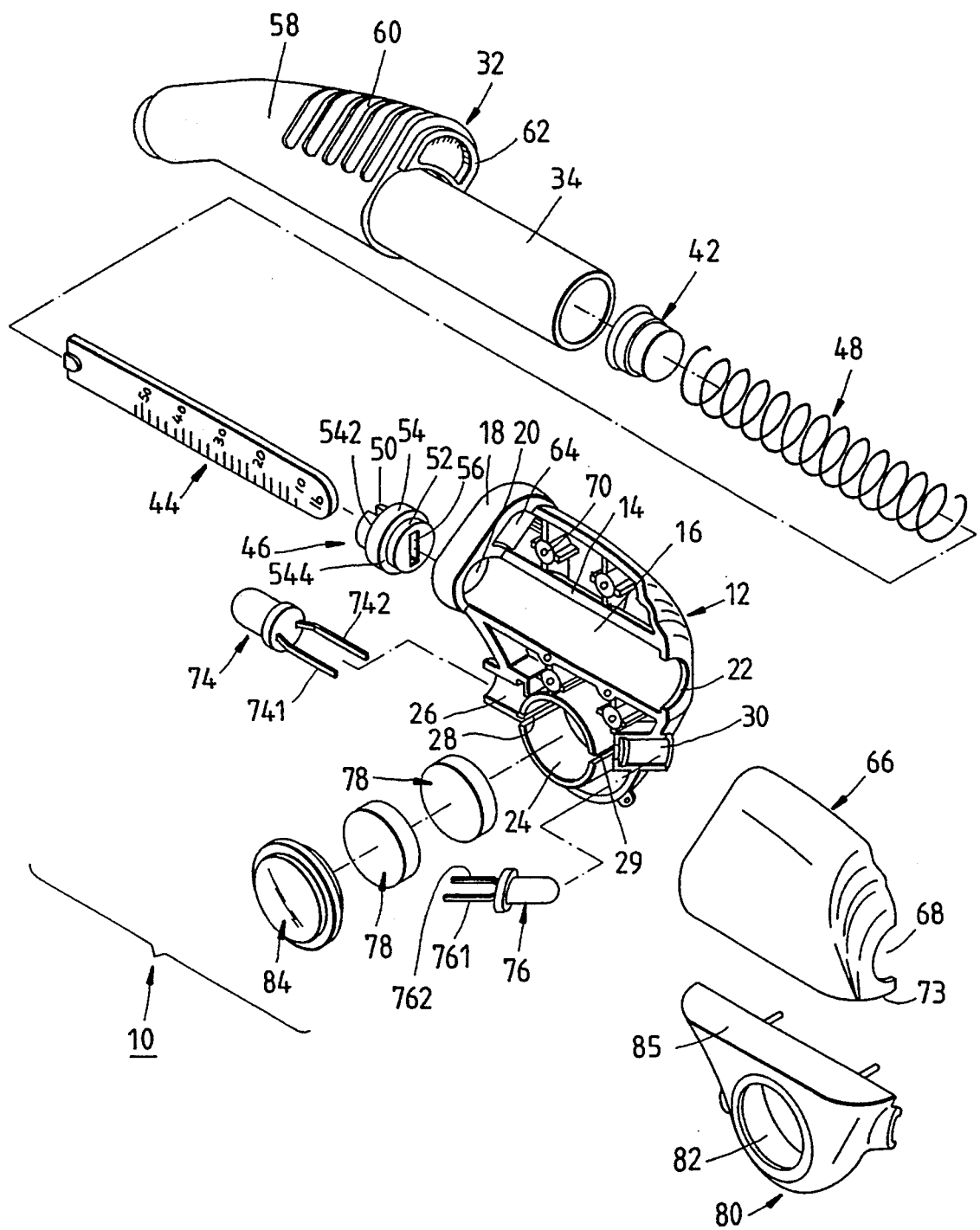
FIG. 2 shows an exploded view of the preferred embodiment of the present invention.

Referring to FIGS. 1-4, a tire pressure gauge 10 embodied in the present invention is shown to comprise an outer housing seat 12 provided in an inner seat surface 14 thereof with a semicircular slot 16 extending along the longitudinal axis of the seat 12. The semicircular slot 16 has an upper open end provided with an oval fringe 18 to form a penetration hole 20. The semicircular slot 16 further has a lower open end provided with a semicircular arresting fringe 22. Located at one side of the semicircular slot 16 is a battery compartment 24 of round construction and having a first lamp socket 26 which extends outwards from the circumferential edge of the battery compartment 24 in such a manner that the first lamp socket 26 is parallel to the longitudinal axis of the seat 12. The battery compartment 24 is provided in the wall thereof with a cut 28 in communication with the first lamp socket 26. The battery compartment 24 is further provided with a second lamp socket 30 which extends from another circumferential edge of the battery compartment 24 at an angle of about 30 degrees toward the lower open end of the semicircular slot 16. The battery compartment 24 has a wall which is adjacent to the wall of the second lamp socket 30 and is provided with another cut 29 through which the battery compartment 24 is in communication with the second lamp socket 30.

A guide tube 32 has a rear end which is put into the semicircular slot 16 via the penetration hole 20 such that the guide tube 32 is in contact with the arresting fringe 22, and that a rear segment 34 of the guide tube 32 is received in the semicircular slot 16. The guide tube 32 is provided therein at the front end thereof with a partition 36 from which a protruded rod 38 extends outwards. Located at one side of the protruded rod 38 is an air hole 40. The guide tube 32 has a space which is located behind the partition 36 and is used to house therein sequentially a piston 42, a scale 44, a pressure-bearing spring 48 and a plug 46. The piston 42 is received securely in a stepped portion 49 of the inner wall surface of the guide tube 32. The pressure-bearing spring 48 has one end that is in contact with the piston 42 and further has another end that is in contact with the plug 46. The scale 44 is fitted into the spring 48. The plug 46 has an upper and a lower short columns 50 and 52, a flange 54 located between the two short columns 50 and 52, and a bar hole 56 passing axially through the upper and the lower short columns 50 and 52. The flange 54 has an upper shoulder face 542 which is pressed against by the spring 48, and a lower shoulder face 544 which is pressed against by the arresting fringe 22. The lower short column 52 is disposed in the lower open end of the semicircular slot 16. The bar hole 56 is so dimensioned as to permit the scale 44 to extend therethrough. The guide tube 32 has a front segment 58 provided horizontally with a protruded portion 60 having at the lower end thereof a retaining projection 62 engageable with a projection retaining hole 64 adjacent to the penetration hole 20. As a result, the guide tube 32 can be connected intimately and securely with the outer housing seat 12.

The outer housing seat 12 has a half that is symmetrical in shape with a first outer housing cover 66 provided therein with a semicircular slot 68 corresponding in location and shape to the semicircular slot 16 of the outer housing seat 12. When the first outer housing cover 66 is joined with the outer housing seat 12, the two semicircular slots 16 and 66 are also joined together to form a complete round slot dimensioned to receive therein the rear segment 34 of the guide tube 32. The first outer housing cover 66 and the outer housing seat 12 are provided therein respectively with a plurality of protuberances (not shown in the drawings) and recesses 70 dimensioned to receive therein the protuberances at the time when the first outer housing cover 66 and the outer housing seat 12 are joined together.

The first and the second lamp sockets 26 and 30 are used respectively to hold lighting fixtures 74 and 76, which are provided respectively with positive and negative conduction wires 741, 742, 761, and 762. These positive and negative conduction wires of the lighting fixtures 74 and 76 are disposed such that they enter the battery compartment 24 respectively via the cuts 28 and 29, and that they are corresponding in location to the positive and the negative terminals of two round batteries 78 housed in the battery compartment 24.

The outer housing seat 12 has another half that is symmetrical in shape with a second outer housing cover 80 and has a through hole 82 corresponding in location to the battery compartment 24. An elastic button 84 is received in the through hole 82. When the second outer housing cover 80 is joined with the outer housing seat 12, an inner side 85 of the second outer housing cover 80 is joined with an inner side 73 of the first outer housing cover 66. The elastic button 84 has a lower end that is disposed in the battery compartment 24. As a result, the lighting fixtures 74 and 76 are caused to illuminate at such time when the elastic button 84 is pressed. It must be noted here that the lighting fixtures 74 and 76 are located at the different sides, and that only one of the two lighting fixtures 74 and 76 may be caused to illuminate by pressing only one side of the elastic button 84. In addition, the second outer housing cover 86 is joined with the outer housing seat 12 in a manner similar to the way that the first outer housing cover 66 is joined with the outer housing seat 12.

According to the tire pressure gauge of the present invention described above, the piston 42, the scale 44, the spring 48 and the plug 46 can be easily assembled and disassembled repeatedly by assembling and disassembling the outer housing seat and the outer housing covers and without disturbing the integrity of the guide tube 32. In other words, the construction of the tire pressure gauge of the present invention is such that an air leak is effectively avoided while the gauge is at work, and that the reading of the tire pressure on the scale 44 can be seen easily at a poorly lighted place, thanks to the lighting fixtures 74 and 76.

What is claimed is:

1. An improved tire pressure gauge comprising:

an outer housing seat provided therein with a semicircular slot extending along a longitudinal axis thereof and having an open end provided with an oval fringe and a penetration hole, said semicircular slot further having another open end provided with an arresting fringe of semicircular construction, said outer housing seat further provided therein with a battery compartment contiguous to said semicircular slot, and with at least one lamp socket extending from a circumferential edge of said battery compartment toward an outer edge of said outer housing seat;

a guide tube having a rear end extending into said semicircular slot via said penetration hole such that said rear end is stopped by said arresting fringe and that a front segment of said guide tube remains outside said semicircular slot and further that a rear segment of said guide tube is received in said semicircular slot, said guide tube further having a front end provided therein with a partition having a center from which a protruded rod extends outwards, said protruded rod having an air hole, said guide tube having therein a space which is located behind said partition and is used to house therein a piston, a pressure scale, a plug, and a pressure-bearing spring fitting over said pressure scale and having one end pressing against said piston and another end pressing against said plug which is received in said rear end of said guide tube and provided with a bar hole dimensioned to permit said pressure scale to extend therethrough;

a first outer housing cover provided therein with a semicircular slot corresponding in location and shape to said semicircular slot of said outer housing seat, said first outer housing cover capable of being joined with said outer housing seat such that said semicircular slot of said first outer housing cover and said semicircular slot of said outer housing seat form together a complete round slot in which a portion of said guide tube is housed;

at least one lighting fixture held in said lamp socket such that a positive conduction wire and a negative conduction wire of said lighting fixture are disposed in said battery compartment; and a second outer housing cover having a through hole corresponding in location to said battery compartment, said second outer housing cover further having an elastic button which is received in said through hole, said second outer housing cover engageable with a portion of said outer housing seat, with said portion of said outer housing seat being a site where said battery compartment and said lamp socket are located such that said positive conduction wire and said negative conduction wire of said lighting fixture are connected respectively with a positive conduction wire and a negative conduction wire of a battery housed in said battery compartment at such time when said second outer housing cover is joined with said outer housing seat and when said elastic button is pressed.

2. The improved tire pressure gauge of claim 1 wherein said outer housing seat is provided with a projection receiving hole adjacent to said penetration hole; and wherein said front segment of said guide tube is provided horizontally with a protruded portion having at a lower end thereof a retaining projection dimensioned to engage said projection receiving hole.

3. The improved tire pressure gauge of claim 1 wherein said plug has an upper short column, a lower short column, and a flange located between said upper short column and said lower short column, with said flange being disposed in said rear end of said guide tube such that said lower short column extends outwards from said rear end of said guide tube to be received in an open end of said round slot formed together by said semicircular slots of said outer housing seat and said first outer housing cover.

4. The improved tire pressure gauge of claim 1 wherein said lamp socket extends at a predetermined angle toward an open end of said semicircular slot such that a portion of said pressure scale extending outwards through said open end of said semicircular slot can be illuminated by said lighting fixture held in said lamp socket.

5. The improved tire pressure gauge of claim 1 wherein said lamp socket faces said front end of said guide tube so that an air valve of a tire can be illuminated by said lighting fixture held in said lamp socket.

6. The improved tire pressure gauge of claim 1 wherein said battery compartment has a wall provided with a cut through which said battery compartment is in communication with said lamp socket.

7. The improved tire pressure gauge of claim 1 wherein said first outer housing cover and said second outer housing cover are located in an inner side along a longitudinal axis of said outer housing seat such that said first outer housing cover and said second outer housing cover are adjacent to each other.

8. The improved tire pressure gauge of claim 1 wherein said first outer housing cover and said second outer housing cover are fastened respectively with said outer housing seat by means of a plurality of protuberances engageable with a plurality of recesses of said outer housing seat, with said protuberances being corresponding in location and number to said recesses.

* * * * *